(12) United States Patent
Sawada et al.

(10) Patent No.: US 11,040,662 B2
(45) Date of Patent: Jun. 22, 2021

(54) VIEWING DEVICE FOR A VEHICLE

(71) Applicant: KABUSHIKI KAISHA TOKAI-RIKA-DENKI-SEISAKUSHO, Aichi-ken (JP)

(72) Inventors: Kazuhiro Sawada, Aichi-ken (JP); Takehiro Hamada, Aichi-ken (JP); Yuto Nakayama, Aichi-ken (JP); Nobuhiro Kudo, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 103 days.

(21) Appl. No.: 16/374,968

(22) Filed: Apr. 4, 2019

(65) Prior Publication Data

US 2019/0315277 A1    Oct. 17, 2019

(30) Foreign Application Priority Data

Apr. 17, 2018  (JP) .............................. JP2018-079179

(51) Int. Cl.
    *B60R 1/00*    (2006.01)
    *B60R 1/10*    (2006.01)
    *B60R 1/062*   (2006.01)

(52) U.S. Cl.
    CPC .............. *B60R 1/062* (2013.01); *B60R 1/006* (2013.01); *B60R 1/10* (2013.01)

(58) Field of Classification Search
    None
    See application file for complete search history.

(56) References Cited

U.S. PATENT DOCUMENTS

| 4,915,485 A * | 4/1990 | Ogasawara ............... B60R 1/06 248/479 |
| 5,966,254 A * | 10/1999 | Flowers .................... B60R 1/06 359/841 |
| 8,016,436 B2 * | 9/2011 | Sugiyama ................. B60R 1/06 359/841 |
| 2015/0251601 A1 * | 9/2015 | Lang ..................... B60R 1/0602 359/872 |
| 2017/0101057 A1 | 4/2017 | Hein et al. |
| 2019/0176706 A1 * | 6/2019 | Hamada .................... B60R 1/12 |

FOREIGN PATENT DOCUMENTS

JP           H2-26957 U       2/1990

* cited by examiner

*Primary Examiner* — Derek S. Chapel
(74) *Attorney, Agent, or Firm* — Roberts Calderon Safran & Cole P.C.

(57) ABSTRACT

A viewing device for a vehicle including: a supporting body provided at a vehicle body side; a pivoting body that is pivotably supported at the supporting body, with a gap being provided between the pivoting body and the supporting body in a radial direction of pivoting; a viewing instrument that is provided at the pivoting body, that facilitates viewing by a vehicle occupant, and that is folded in or folded out as a result of the pivoting body being pivoted to one side or to another side; and a restricting portion that is provided at one of the supporting body or the pivoting body, and that restricts communication between one side and another side of the gap, with the restriction of communication between the one side and the other side of the gap being released when the viewing instrument is folded in or folded out.

7 Claims, 7 Drawing Sheets

VIEWING DEVICE FOR A VEHICLE

CROSS-REFERENCE TO RELATED APPLICATION

This application is based on and claims priority under 35 USC 119 from Japanese Patent Application No. 2018-079179 filed on Apr. 17, 2018, the disclosure of which is incorporated by reference herein.

BACKGROUND

Technical Field

The present disclosure relates to a viewing device for a vehicle in which a viewing apparatus is folded in or folded out.

Related Art

In a door mirror described in Japanese Unexamined Utility Model Application (JP-U) No. H2-26957, a mirror body is supported on a pedestal of a mirror stay, and a mirror of this mirror body is folded in or folded out when the mirror body is pivoted to one side or to another side.

In addition, a gap is provided in a pivot radial direction of the mirror body between the mirror stay pedestal and the mirror body, and a sealing material of the mirror body restricts communication between one side and the other side of this gap.

Here, in this door mirror, when the mirror is being folded in or folded out, the sealing material is constantly sliding over the pedestal of the mirror stay so that the restriction on the communication between the one side and the other side of the gap provided by the sealing material is maintained.

SUMMARY

The present disclosure was conceived in view of the above-described circumstances, and it is an object thereof to provide a viewing device for a vehicle that is able to inhibit any reduction in the pivoting performance of a pivoting body.

A viewing device for a vehicle according to a first aspect of the present disclosure is provided with a supporting body provided at a vehicle body side, a pivoting body that is pivotably supported at the supporting body, with a gap being provided between the pivoting body and the supporting body in a radial direction of pivoting, a viewing instrument that is provided at the pivoting body, that facilitates viewing by a vehicle occupant, and that is folded in or folded out as a result of the pivoting body being pivoted to one side or to another side, and a restricting portion that is provided at one of the supporting body or the pivoting body, and that restricts communication between one side and another side of the gap, with the restriction of the communication between the one side and the other side of the gap being released when the viewing instrument is folded in or folded out.

A viewing device for a vehicle of a second aspect of the present disclosure is characterized in that, in the viewing device for a vehicle of the first aspect of the present disclosure, there is included a deforming portion that is provided at the restricting portion, that is curved, and that is elastically deformed by the other one of the supporting body or the pivoting body when the viewing instrument is being folded in or folded out, such that pivoting of the pivoting body is permitted.

A viewing device for a vehicle of a third aspect of the present disclosure is characterized in that, in the viewing device for a vehicle of the first or second aspects of the present disclosure, when the viewing instrument is being folded in or folded out, the restricting portion becomes tilted such that pivoting of the pivoting body is permitted.

A viewing device for a vehicle of a fourth aspect of the present disclosure is characterized in that, in the viewing device for a vehicle of any one of the first through third aspects of the present disclosure, the restricting portion is disposed at an inner side of the gap.

A viewing device for a vehicle of a fifth aspect of the present disclosure is characterized in that, in the viewing device for a vehicle of any one of the first through fourth aspects of the present disclosure, there is included a contact surface that is provided at the other one of the supporting body or the pivoting body, that is flat, and that, when contacted by the restricting portion, restricts communication between the one side and the other side of the gap.

In the viewing device for a vehicle of the first aspect of the present disclosure, a pivoting body is pivotably supported at a supporting body at a vehicle body side, and a viewing instrument of this pivoting body facilitates viewing by a vehicle occupant. The viewing instrument is folded in or folded out as a result of the pivoting body being pivoted to one side or to another side. Furthermore, a gap is provided between the supporting body and the pivoting body in the radial direction of pivoting of the pivoting body, and a restricting portion at one of the supporting body or the pivoting body restricts communication between one side and the other side of this gap.

Here, when the viewing instrument is folded in or folded out, the restriction of the communication between the one side and the other side of the gap by the restricting portion is released. Because of this, it is possible to inhibit the restricting portion from restricting the pivoting of the pivoting body to the one side or the other side, and to thereby inhibit any reduction in the pivoting performance of the pivoting body.

In the viewing device for a vehicle of the second aspect of the present disclosure, when the viewing instrument is being folded in or folded out, a deforming portion of the restricting portion is elastically deformed by the other one of the supporting body or the pivoting body, such that the pivoting of the pivoting body is permitted.

Here, this deforming portion is curved. Because of this, it is possible to suitably inhibit the pivoting of the pivoting body being obstructed by the deforming portion.

In the viewing device for a vehicle of the third aspect of the present disclosure, when the viewing instrument is being folded in or folded out, the restricting portion becomes tilted such that the pivoting of the pivoting body is permitted. Because of this, it is possible to suitably inhibit the pivoting of the pivoting body being obstructed by the restricting portion.

In the viewing device for a vehicle of the fourth aspect of the present disclosure, the restricting portion is disposed at the inner side of the gap. Because of this, it is possible to inhibit the restricting portion from being visible from the outside of the gap.

In the viewing device for a vehicle of the fifth aspect of the present disclosure, the restricting portion is contacted by a contact surface of the other one of the supporting body or the pivoting body, and thereby restricts communication between the one side and the other side of the gap.

Here, the contact surface is a flat surface. Because of this, the restricting portion suitably restricts communication between the one side and the other side of the gap.

BRIEF DESCRIPTION OF THE DRAWINGS

Exemplary embodiments of the present disclosure will now be described in detail based on the following figures, wherein.

DETAILED DESCRIPTION

First Exemplary Embodiment

Figure 1:
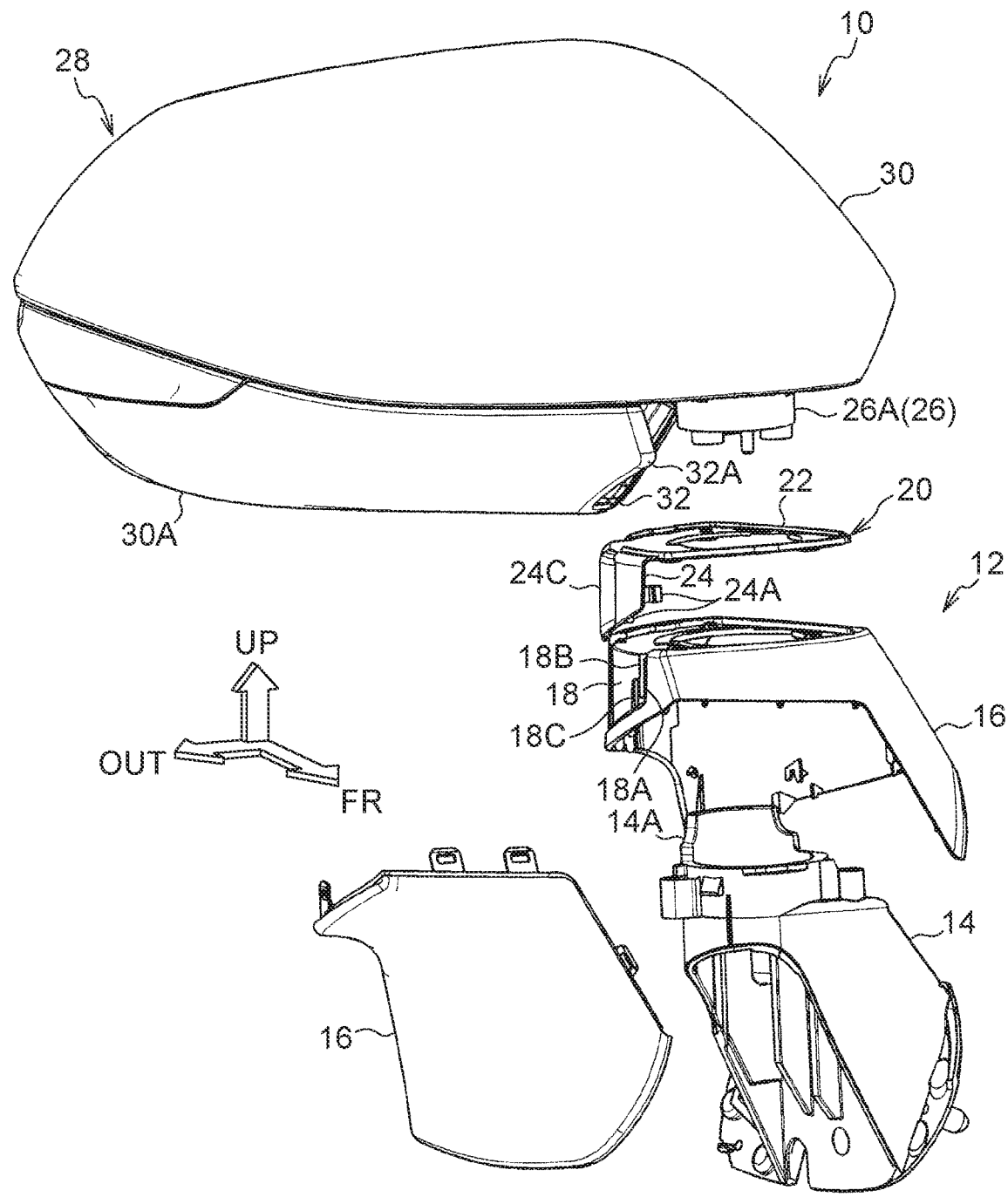
FIG. 1 is an exploded perspective view as seen from a vehicle front side and an outer side (i.e., a vehicle right side) in a vehicle width direction showing a mirror device for a vehicle according to a first exemplary embodiment of the present disclosure.

A mirror device 10 for a vehicle, which functions as a viewing device for a vehicle, according to a first exemplary embodiment of the present disclosure is shown in FIG. 1 in an exploded perspective view as seen from a vehicle front side and an outer side (i.e., a vehicle right side) in a vehicle width direction. Note that an arrow FR, an arrow OUT, and an arrow UP that are shown in the drawings respectively indicate a vehicle forward direction, an outer side in a vehicle width direction, and a vehicle upward direction.

The mirror device 10 for a vehicle according to the present exemplary embodiment is provided in a central portion in an vertical direction and at a vehicle front-side end of a side door (and of a front side door, in particular), which functions as a door of a vehicle (i.e., functions as a vehicle body side), and is disposed on the vehicle outer side thereof.

Figure 2:
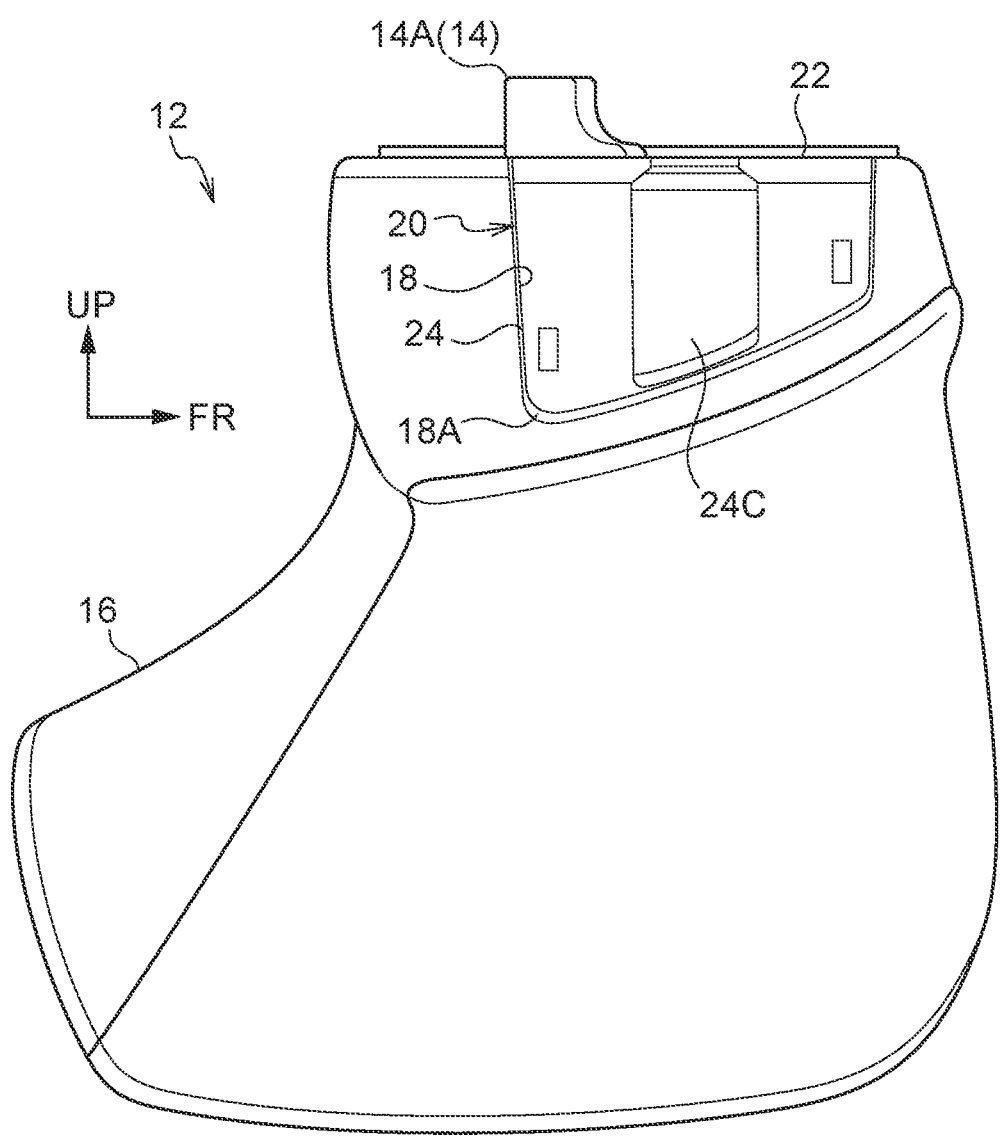
FIG. 2 is a side view as seen from an outer side in the vehicle width direction showing a base body of the mirror device for a vehicle according to the first exemplary embodiment of the present disclosure.

As shown in FIG. 1, a base body 12 (see FIG. 2), which functions as a main body portion forming part of a supporting body, is provided in the mirror device 10 for a vehicle, and a base 14 that is made either of metal or of resin is provided in the base body 12. A lower portion of the base 14 is fixed to the side door, and the mirror device 10 for a vehicle is installed on the side door via this lower portion. An upper end portion 14A of the base 14 is formed in a substantially circular cylinder shape having one closed end, and an axial direction of the upper end portion 14A of the base 14 extends in parallel with the vertical direction, and an interior thereof is open on the upward side.

A base cover 16 which is formed from resin in a substantially circular cylinder shape having one closed end is provided around an outer periphery of the base 14, and an interior of the base cover 16 is open on the lower side. The base cover 16 is fixed to the base 14, and a circumferential wall of the base cover 16 covers the outer periphery of the base 14. In addition, the upper end portion 14A of the base 14 penetrates an upper wall (i.e., a closed wall) of the base cover 16. An upper portion of the circumferential wall (see FIG. 3) of the base cover 16 is curved so as to be coaxial with the upper end portion 14A of the base 14 within a range extending from an outer portion in the vehicle width direction to a vehicle rear-side portion thereof.

A recessed portion 18 having a substantially trapezoidal shape when seen in a front view is formed in an outer-side portion in the vehicle width direction of the circumferential wall upper portion of the base cover 16. The recessed portion 18 is open on the upper side and the outer side in the vehicle width direction, and a lower surface thereof is inclined so as to become progressively lower as it approaches the vehicle rear side. An engaging surface 18A is formed on a vehicle front-side end portion, a vehicle rear-side end portion, and a lower end portion of the recessed portion 18, and the engaging surface 18A is disposed between the closed wall of the recessed portion 18 and an outer circumferential surface of the circumferential wall upper portion of the base cover 16. Rectangular through holes 18B are formed penetrating a vehicle front-side portion and a vehicle rear-side portion of the closed surface of the recessed portion 18, and these through holes 18B extend in the vertical direction. Ribs 18C having a rectangular cross-section and which functions as a restricting portion are provided on the closed wall of the recessed portion 18 on an inner side in the vehicle front-rear direction of the through holes 18B, and these ribs 18C protrude towards the outer side in the vehicle width direction and extend in the vertical direction.

A plate-shaped seal 20 that is formed from resin is provided as a restricting component on an upper side and outer side in the vehicle width direction of the base cover 16. The rigidity of the seal 20 is less than the rigidity of the base cover 16, and the seal 20 also has elasticity. An upper wall 22 of the seal 20 is formed in a toroidal shape, and this upper wall 22 is fixed to the upper wall of the base cover 16 so as to cover an upper side of the upper wall of the base cover 16. The upper end portion 14A of the base 14 penetrates the upper wall 22. A side wall 24, which functions as the restricting portion of the seal 20, is formed in a curved plate shape having a substantially trapezoidal shape when seen in a front view, and apart from a central portion in the vehicle front-rear direction, the side wall 24, is curved so as to be coaxial with the upper end portion 14A of the base 14. A lower surface of the side wall 24 is inclined so as to become progressively lower as it approaches the vehicle rear side, and the side wall 24 substantially engages with the recessed portion 18 of the base 14. A vehicle front-side end portion, a vehicle rear-side end portion, and a lower end portion of the side wall 24 engage with the engaging surface 18A of the recessed portion 18, and the recessed portion 18 is sealed by the side wall 24.

Attachment claws 24A, which function as attachment portions, are formed integrally with a vehicle front-side portion and a vehicle rear-side portion of the side wall 24. The attachment claws 24A protrude towards the inner side in the vehicle width direction, and are inserted through the through holes 18B formed in the closed wall of the recessed portion 18. A distal end portion of each attachment claw 24A protrudes towards the outer side in the vehicle front-rear direction of the side wall 24, and the distal end portion of the attachment claws 24 engages with the closed wall of the recessed portion 18 from the inner side in the vehicle width direction and the through hole 18B side thereof so that movement of the attachment claws 24 towards the outer side in the vehicle width direction is restricted. Because of this, movement of the side wall 24 toward the outer side in the vehicle width direction is restricted, and the side wall 24 is attached to the recessed portion 18.

Rectangular-column shaped restriction columns 24B, which function as restricted portions, are formed integrally with the vehicle front-side portion and the vehicle rear-side portion of the side wall 24 on the inner side in the vehicle front-rear direction from the attachment claws 24A. The restriction columns 24B protrude towards the inner side in the vehicle width direction and also extend in the vehicle vertical direction. The restriction columns 24B abut from the outer side in the vehicle front-rear direction of the side wall 24 against the ribs 18C on the closed wall of the recessed portion 18. As a result, movement of the restriction columns 24B towards the ribs 18C side is restricted, and movement of the side wall 24 towards the inner side in the vehicle front-rear direction is also restricted.

A substantially circular-cylinder sidewall shaped deforming plate 24C, which functions as a deforming portion, is formed in a central portion in the vehicle front-rear direction of the side wall 24, and this deforming plate 24C is curved so as to protrude towards the outer side in the vehicle width direction. The deforming plate 24C extends in the vertical direction, and an upper surface and a lower surface of the deforming plate 24C are blocked off. A width dimension (i.e., a dimension in the vehicle front-rear dimension) of the deforming plate 24C is larger (for example, five times larger) than a protrusion dimension (i.e., than a dimension in the vehicle width direction) thereof, and a curvature of the deforming plate 24C is kept small.

A fold-in mechanism 26 is supported on an upper side of the base body 12. A substantially circular-column shaped stand 26A, which functions as a supporting portion forming part of the supporting body, is provided in the fold-in mechanism 26. The stand 26A is fixed so as to be coaxial with the upper end portion 14A of the base 14 of the base body 12.

An inner side portion in the vehicle width direction of a pivoting body 28 (see FIG. 3) is supported on the stand 26A, and an operating body (not shown in the drawings) is provided in an inner side portion in the vehicle width direction of the pivoting body 28. The operating body forms part of the fold-in mechanism 26, and is supported on the stand 26A. When the fold-in mechanism 26 is operated, the operating body is pivoted relative to the stand 26A, so that the pivoting body 28 is able to pivot around the stand 26A in a fold-in direction (i.e., a direction indicated by an arrow A in FIG. 3), and a fold-out direction (i.e., a restoral direction —indicated by an arrow B in FIG. 3).

A resin visor 30, which functions as sliding component, is provided on the pivoting body 28, and the rigidity of the visor 30 is greater than the rigidity of the seal 20 of the base body 12. An inner side portion in the vehicle width direction of the visor 30 is fixed to the operating body of the fold-in mechanism 26, and the visor 30 is able to pivot integrally with the operating body.

A visor cover 30A, which functions as a covering component, is provided on a vehicle front-side portion of the visor 30, and a visor body 30B, which functions as a housing component, is provided on a vehicle rear-side portion of the visor 30. The visor cover 30A is assembled together with the visor body 30B, and the visor cover 30A covers the vehicle front side of the visor body 30B.

A frame-shaped facing frame 32 having a U-shaped cross-section is provided as a facing portion at an inner-side end portion in the vehicle width direction of a lower portion of the visor 30. An interior of the facing frame 32 is open on the lower side and the inner side in the vehicle width direction. An inner side in the vehicle width direction of the facing frame 32 faces the circumferential wall upper portion of the base cover 16 of the base body 12, and a gap 34 is formed in a pivot radial direction of the pivoting body 28 between the facing frame 32 and the circumferential wall upper portion of the base cover 16.

A substantially curved-plate shaped extension plate 32A, which functions as a contact portion, is provided on a vehicle front-side portion of the facing frame 32, and the extension plate 32A is provided on the visor cover 30A. The extension plate 32A extends towards the inner side in the vehicle width direction, and a distal end of the extension plate 32A faces the circumferential wall upper portion of the base cover 16 of the base body 12 from a distance.

A substantially flat-plate shaped first facing plate 32B is provided in a portion on the vehicle front side and the inner side in the vehicle width direction of the facing frame 32, and the first facing plate 32B is provided on the visor cover 30A. A vehicle front-side end of the first facing plate 32B is formed integrally with an outer-side end in the vehicle width direction of the extension plate 32A, and the first facing plate 32B is disposed perpendicularly to the vehicle width direction. A substantially flat-plate shaped second facing plate 32C is provided in a portion on the vehicle rear side and the inner side in the vehicle width direction of the facing frame 32. The second facing plate 32C is provided on the visor body 30B, and is also disposed perpendicularly to the vehicle width direction.

A vehicle rear-side end portion of the first facing plate 32B and a vehicle front-side end portion of the second facing plate 32C overlap each other, and an inner-side surface in the vehicle width direction of the first facing plate 32B is flush with an inner-side surface in the vehicle width direction of the second facing plate 32C so as to form a planar contact surface 32D. The deforming plate 24C of the side wall 24 of the seal 20 of the base body 12 is placed in contact, in a state of elastic deformation, with the entire surface in the vertical direction of the contact surface 32D. The side wall 24 (including the deforming plate 24C) of the seal 20 provides a seal between the facing frame 32 of the visor 30 and the circumferential wall upper portion of the base cover 16. As a result, communication between a vehicle front side (i.e., the fold-out direction side—also referred to as another side) and a vehicle rear side (i.e., the fold-in direction side—also referred to as one side) of a gap 34 between the facing frame 32 and the circumferential wall upper portion of the base cover 16 is restricted.

A plate shaped mirror (not shown in the drawings), which functions as a viewing instrument, is housed within the visor body 30B so as to be able to pivot as a single body therewith, and this mirror is exposed to the vehicle rear side from the visor body 30B. A mirror surface of the mirror faces towards the vehicle rear side, and visibility of a vehicle occupant towards the vehicle rear side is assisted by reflections of light from the mirror surface of this mirror.

Next, an action of the present exemplary embodiment will be described.

In the mirror device 10 for a vehicle having the above-described structure, when the pivoting body 28 is folded out, the deforming plate 24C of the side wall 24 of the seal 20 of the base body 12 comes into contact with the contact surface 32D of the facing frame 32 of the visor 30, and the side wall 24 of the seal 20 restricts communication between the vehicle front side and the vehicle rear side of the gap 34 between the facing frame 32 and the circumferential wall upper portion of the base cover 16. Because of this, when a vehicle is traveling, the side wall 24 of the seal 20 restricts traveling wind from passing from the vehicle front side to the vehicle rear side through the gap 34, so that wind noise caused by the gap 34 can be inhibited.

Furthermore, when the fold-in mechanism 26 is operated, the pivoting body 28 (i.e., including the operating body, visor 30, and mirror of the fold-in mechanism 26) is pivoted around the stand 26A of the fold-in mechanism 26. In this case, the pivoting body 28 is folded in as a result of the pivoting body 28 being pivoted in the fold-in direction. In addition, the pivoting body 28 is folded out (i.e., is restored) as a result of the pivoting body 28 being pivoted in the fold-out direction.

Figure 3:
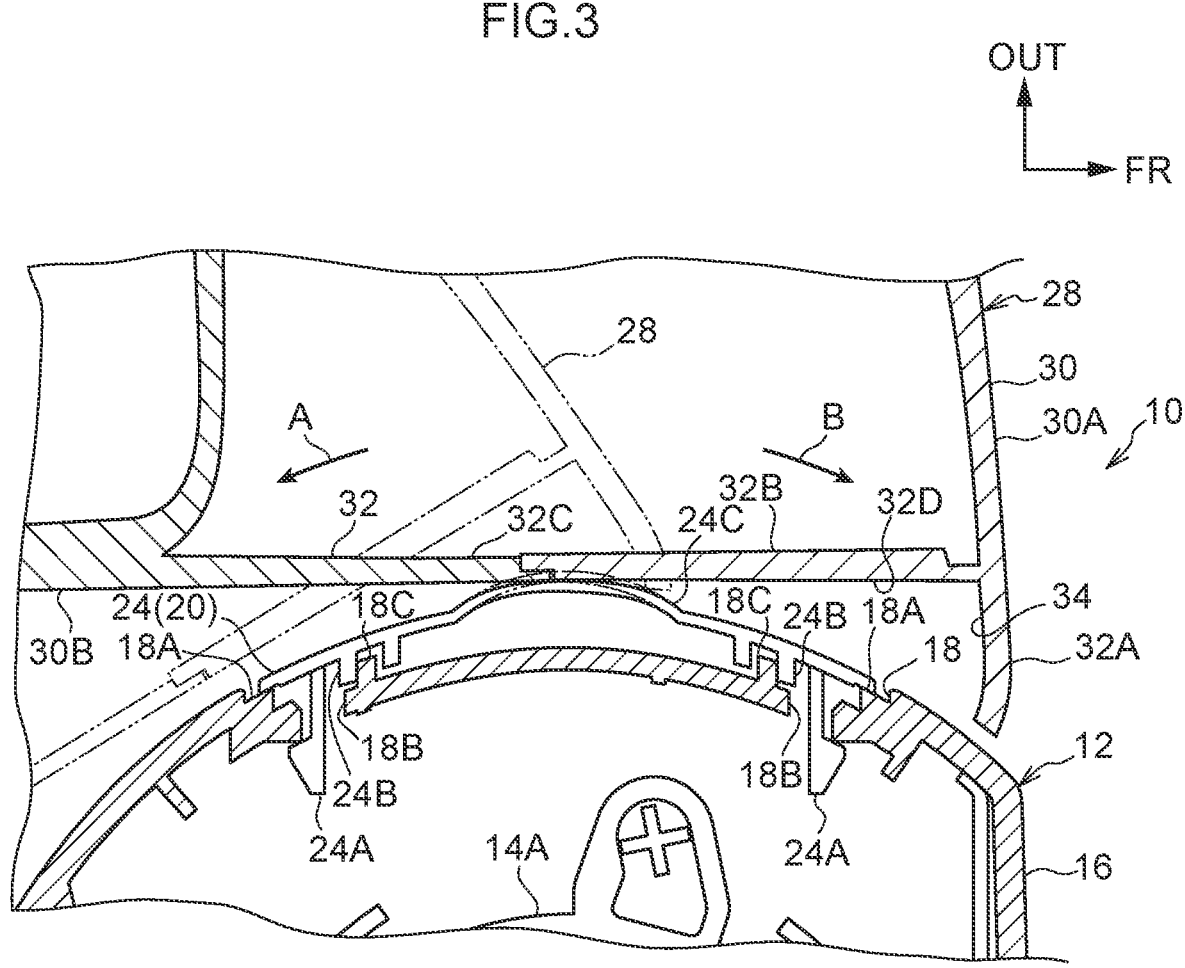
FIG. 3 is a cross-sectional view as seen from an underside thereof showing a folded-out state of a pivoting body of the mirror device for a vehicle according to the first exemplary embodiment of the present disclosure.
Figure 4:
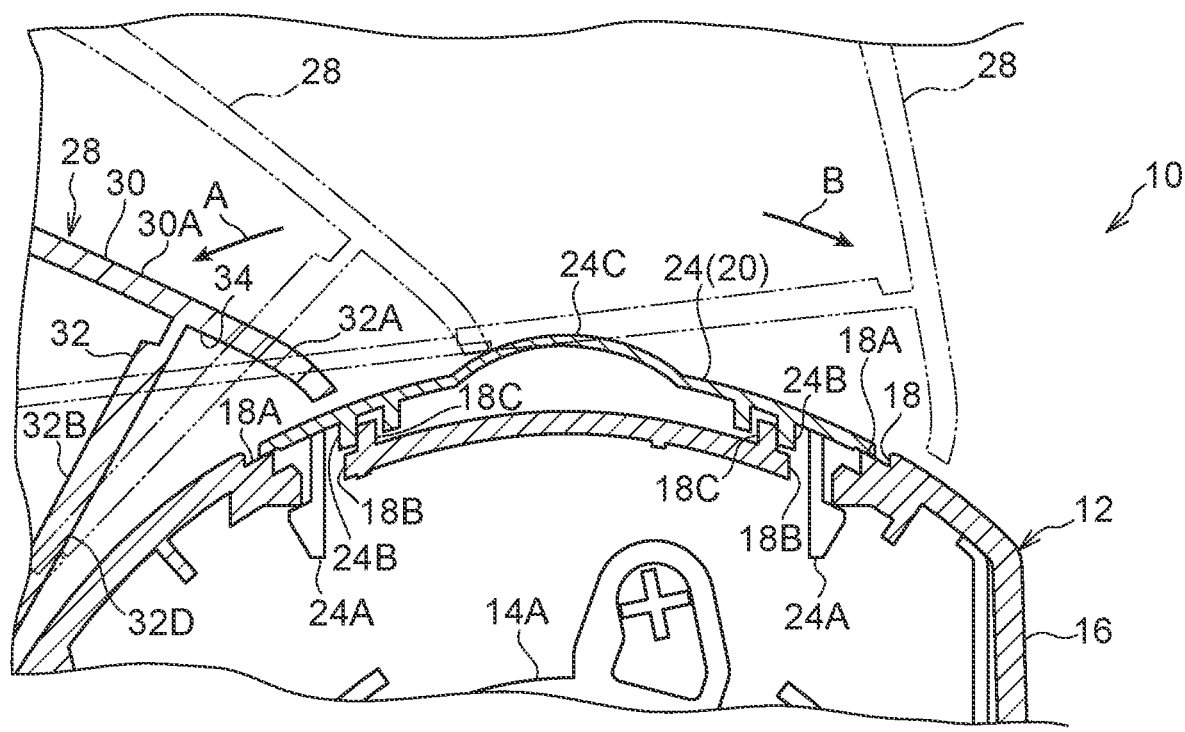
FIG. 4 is a cross-sectional view as seen from an underside thereof showing a folded-in state of the pivoting body of the mirror device for a vehicle according to the first exemplary embodiment of the present disclosure.

Here, when the pivoting body 28 is being folded in or folded out, the contact surface 32D of the facing frame 32 moves away from the deforming plate 24C, so that the communication restriction created by the side wall 24 of the seal 20 between the vehicle front side and the vehicle rear side of the gap 34 is released (see FIG. 3 and FIG. 4). Because of this, apart from the period during which the contact surface 32D of the facing frame 32 is in contact with the deforming plate 24C, and the period during which the distal end of the extension plate 32A of the facing frame 32 is being contacted by the deforming plate 24C, the facing frame 32 does not slide against the deforming plate 24C, and no sliding resistance is generated between the pivoting body 28 (i.e., the visor 30) and the deforming plate 24. As a result, it is possible to inhibit the deforming plate 24C from restricting the pivoting of the pivoting body 28 in the fold-in direction and the fold-out direction, and it is also possible to inhibit any reduction in the pivot performance of the pivoting body 28 that might be caused by the operation of the fold-in mechanism 26.

Furthermore, when the pivoting body 28 is being folded in or folded out, normally, the vehicle is stopped. Because of this, when the pivoting body 28 is being folded in or folded out, even if the communication restriction created by the side wall 24 of the seal 20 between the vehicle front side and the vehicle rear side of the gap 34 is released, when the vehicle is traveling, wind noise caused by the gap 34 can be inhibited.

Additionally, the contact surface 32D of the facing frame 32 is formed as a flat surface. Because of this, when the pivoting body 28 has been folded out, the deforming plate 24C is able to make appropriate contact with the contact surface 32D, and the side wall 24 of the seal 20 is able to suitably restrict communication between the vehicle front side and the vehicle rear side of the gap 34. As a consequence, wind noise caused by the gap 34 can be suitably inhibited.

Furthermore, when the pivoting body 28 has been folded out, the amount of elastic deformation of the deforming plate 24C caused by the facing frame 32 is at the maximum, and the force that is restricting communication between the vehicle front side and the vehicle rear side of the gap 34 provided by the side wall 24 of the seal 20 is also at the maximum (see FIG. 3). Because of this, wind noise caused by the gap 34 can be more suitably inhibited.

In addition, the deforming plate 24C is curved. Because of this, when the pivoting body 28 is being folded in or folded out, even if the distal end of the extension plate 32A of the facing frame 32 is contacted by the deforming plate 24C (see FIG. 3 and FIG. 4), it is possible to inhibit the extension plate 32A from becoming caught on the deforming plate 24C, and to thereby suitably inhibit the deforming plate 24C from obstructing the pivoting of the pivoting body 28.

Furthermore, the width dimension of the deforming plate 24C is set larger than the protrusion dimension thereof, and the radius of curvature is kept small. Because of this, when the pivoting body 28 is being folded in or folded out, even if the distal end of the extension plate 32A is contacted by the deforming plate 24C, it is possible to effectively inhibit the extension plate 32A from becoming caught on the deforming plate 24C, and to effectively inhibit the deforming plate 24C from obstructing the pivoting of the pivoting body 28.

Moreover, when the pivoting body 28 is being folded in, even if the distal end of the extension plate 32A presses the deforming plate 24C towards the vehicle rear side (see FIG. 3), the restriction columns 24B on the vehicle front side of the seal 20 abut against the ribs 18C on the vehicle front side of the base cover 16, so that movement of the attachment claws 24A on the vehicle front side of the seal 20 towards the vehicle rear side is restricted. As a result of this, any releasing of the engagement of the distal end portion of the attachment claws 24A on the vehicle front side with the closed wall of the recessed portion 18 of the base cover 16 is restricted. As a consequence, it is possible to restrict the seal of the recessed portion 18 by the vehicle front-side portion of the side wall 24 of the seal 20 from being released.

Furthermore, when the pivoting body 28 is being folded in, even if the distal end of the extension plate 32A presses the deforming plate 24C towards the vehicle rear side (see FIG. 3), as a result of the attachment claws 24A on the vehicle rear side of the seal 20 moving to the vehicle rear side, the extent of the engagement of the distal end portion of the attachment claws 24A on the vehicle rear side with the closed wall of the recessed portion 18 of the base cover 16 is increased. Because of this, it is possible to restrict the seal of the recessed portion 18 by the vehicle rear-side portion of the side wall 24 of the seal 20 from being released.

Additionally, when the pivoting body 28 is being folded out, even if the distal end of the extension plate 32A presses the deforming plate 24C towards the vehicle front side (see FIG. 4), the restriction columns 24B on the vehicle rear side of the seal 20 abut against the ribs 18C on the vehicle rear side of the base cover 16, so that movement of the attachment claws 24A on the vehicle rear side of the seal 20 towards the vehicle front side is restricted. As a result of this, any releasing of the engagement of the distal end portion of the attachment claws 24A on the vehicle rear side with the closed wall of the recessed portion 18 of the base cover 16 is restricted. As a consequence, it is possible to restrict the seal of the recessed portion 18 by the vehicle rear-side portion of the side wall 24 of the seal 20 from being released.

Furthermore, when the pivoting body 28 is being folded out, even if the distal end of the extension plate 32A presses the deforming plate 24C towards the vehicle front side (see FIG. 4), as a result of the attachment claws 24A on the vehicle front side of the seal 20 moving to the vehicle front side, the extent of the engagement of the distal end portion of the attachment claws 24A on the vehicle front side with the closed wall of the recessed portion 18 of the base cover 16 is increased. Because of this, it is possible to restrict the seal of the recessed portion 18 by the vehicle front-side portion of the side wall 24 of the seal 20 from being released.

In addition, the side wall 24 of the seal 20 is disposed on the inner side in the vehicle front-rear direction of the gap 34. Because of this, it is possible to inhibit the side wall 24 from being visible from the outer side in the vehicle front-rear direction of the gap 34, so that the mirror device 10 for a vehicle can be furnished with a pleasing exterior appearance.

Second Exemplary Embodiment

Figure 5:
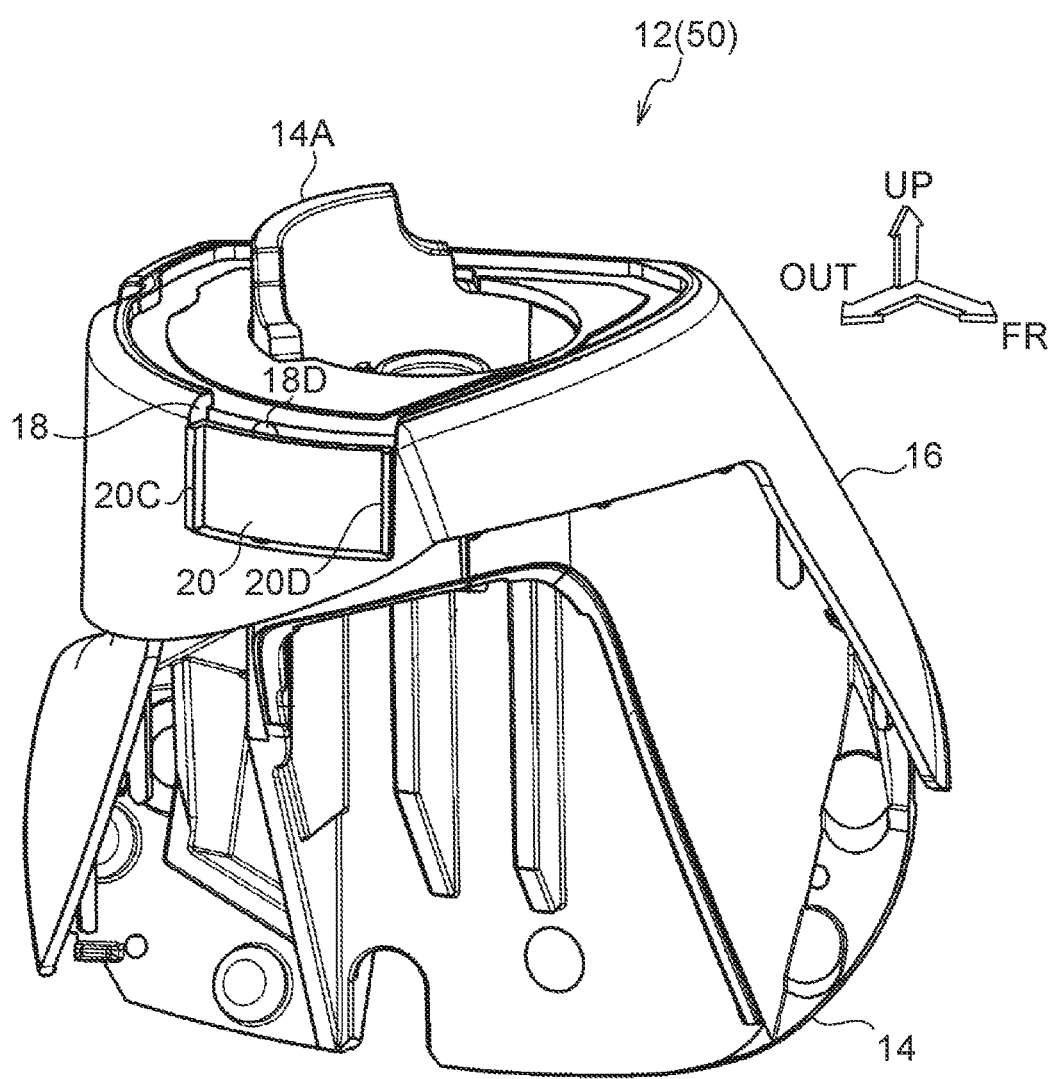
FIG. 5 is a side view as seen from an outer side in the vehicle width direction showing a base body of a mirror device for a vehicle according to a second exemplary embodiment of the present disclosure.

FIG. 5 shows a side view as seen from an outer side in the vehicle width direction of the base body 12 of a mirror device 50 for a vehicle according to a second exemplary embodiment of the present disclosure.

The structure of the mirror device 50 for a vehicle according to the present exemplary embodiment is substantially the same as that of the above-described first exemplary embodiment but differs, however, in the following way.

Figure 6A:
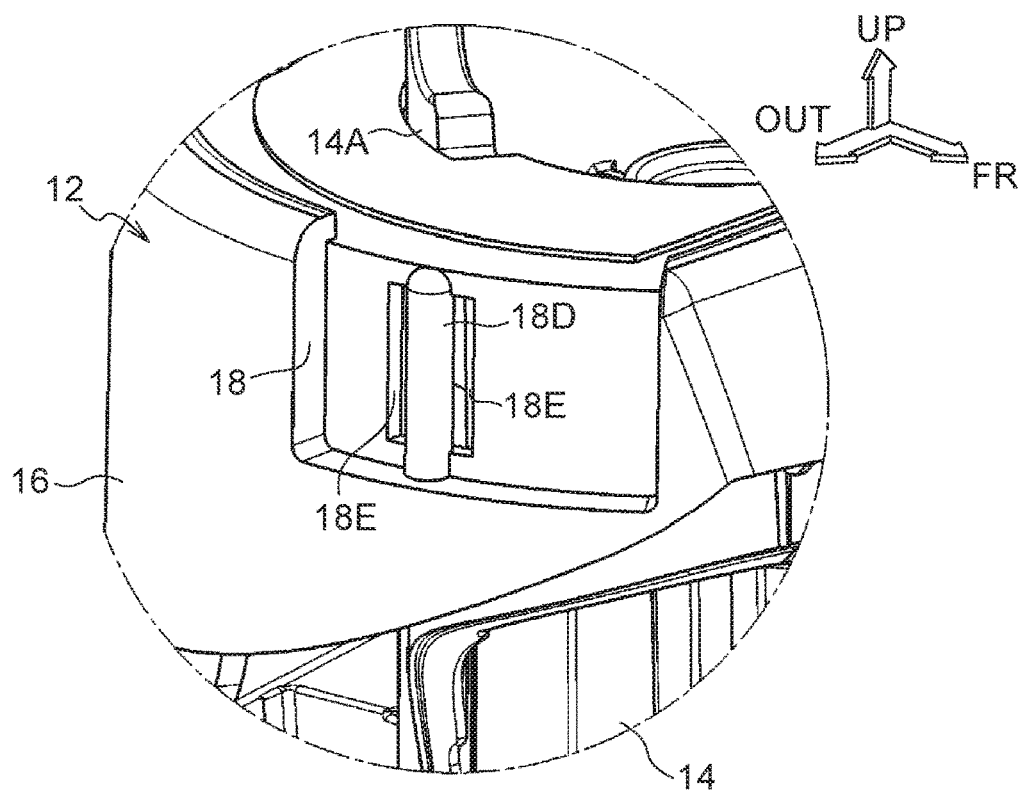
FIG. 6A is a view as seen from a vehicle front side and an outer side in a vehicle width direction showing a recessed portion of a base body of the mirror device for a vehicle according to the second exemplary embodiment of the present disclosure.
Figure 6B:
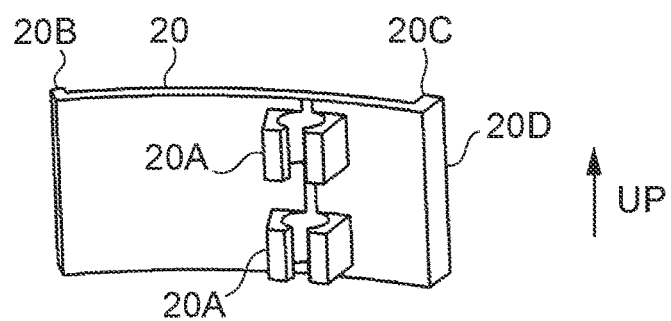
FIG. 6B is a view as seen from an inner side in a vehicle width direction showing a seal of the base body of the mirror device for a vehicle according to the second exemplary embodiment of the present disclosure.
Figure 6C:
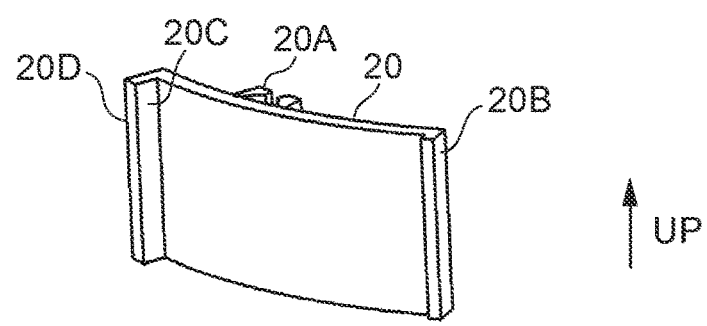
FIG. 6C is a view as seen from an outer side in a vehicle width direction showing the seal of the base body of the mirror device for a vehicle according to the second exemplary embodiment of the present disclosure.

As is shown in FIG. 5, in the mirror device 50 for a vehicle according to the present exemplary embodiment, the recessed portion 18 (see FIG. 6 (A)) of the base body 12 is disposed on the vehicle front side of an outer side portion in the vehicle width direction of the circumferential wall upper portion of the base cover 16, and the recessed portion 18 is formed in a rectangular shape when seen in a front view. A substantially circular-column shaped attachment shaft 18D, which functions as an attachment portion, is formed integrally with a vehicle rear-side portion of the closed wall of the recessed portion 18, and this attachment shaft 18D extend in the vertical direction. A rectangular insertion hole 18E is formed penetrating the closed wall of the recessed portion 18 on the vehicle front side and the vehicle rear side of the attachment shaft 18D, and this through hole 18E expand in the vertical direction. Note that the engaging surface 18A and the through holes 18B of the first exemplary embodiment are not provided in the recessed portion 18.

The seal 20 (see FIG. 6 (B) and FIG. 6 (C)) of the base body 12 is formed in a substantially rectangular plate shape. The seal 20 is curved so as to be coaxial with the upper end portion 14A of the base 14, and is engaged with the recessed portion 18. A pair of attachment frames 20A having a substantially C-shaped cross-section are formed integrally with a vehicle rear-side portion of an inner side surface in the vehicle width direction of the seal 20, and these attachment frames 20A are placed next to each other in a vertical direction. The attachment shaft 18D of the recessed portion 18 is engaged with the interior of the pair of attachment frames 20A, and the pair of attachment frames 20A are inserted in the insertion hole 18E of the recessed portion 18.

Figure 7A:
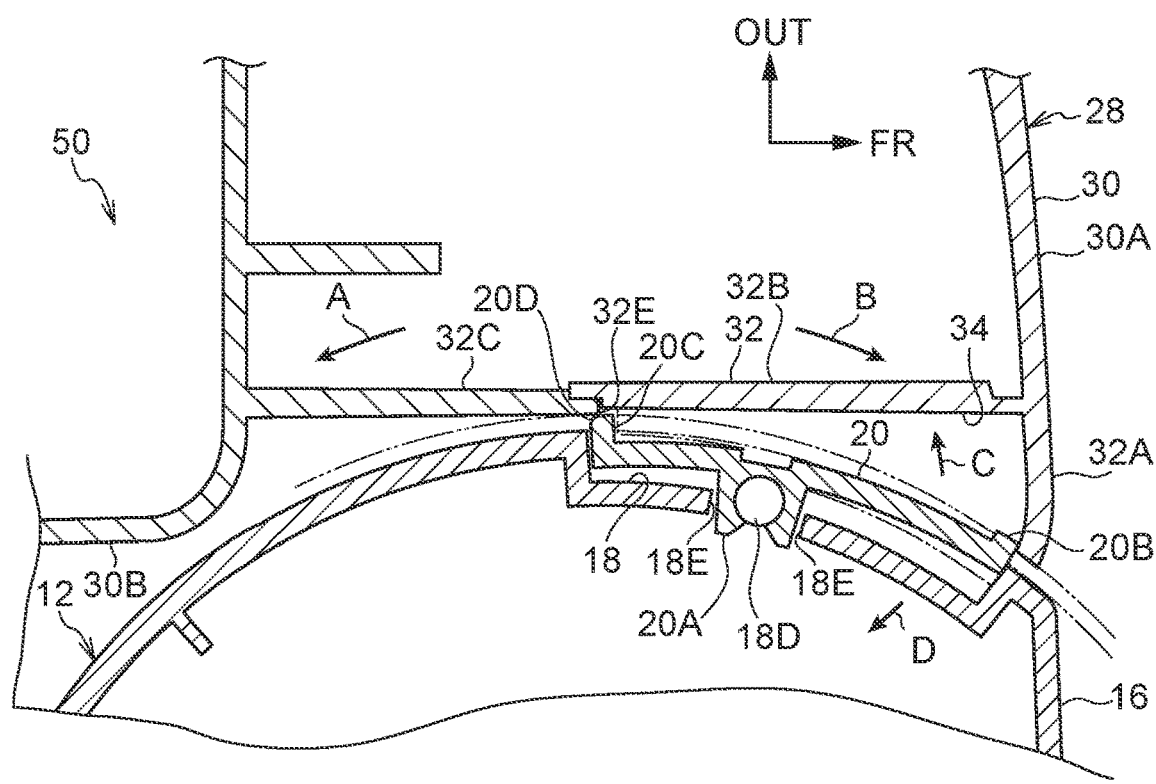
FIG. 7A is a cross-sectional view as seen from an underside thereof showing the mirror device for a vehicle according to the second exemplary embodiment of the present disclosure, and shows a folded-out state of the pivoting body.
Figure 7B:
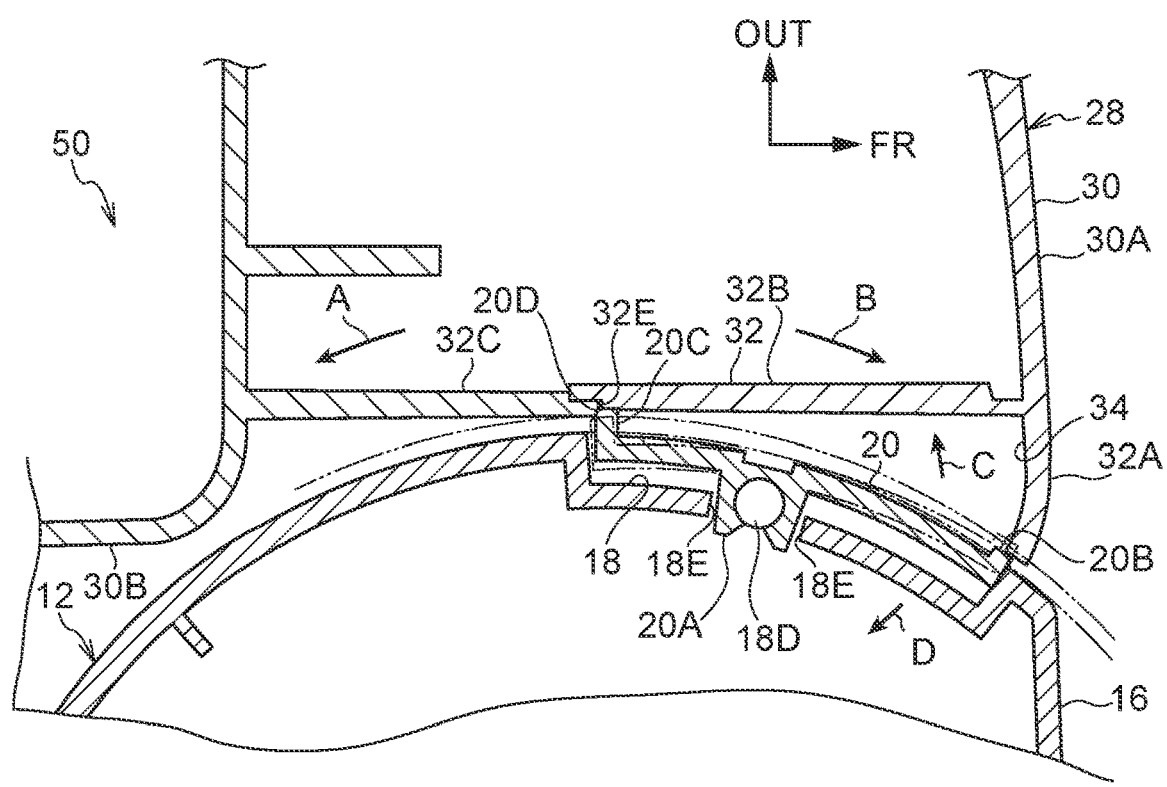
FIG. 7B is a cross-sectional view as seen from an underside thereof showing the mirror device for a vehicle according to the second exemplary embodiment of the present disclosure, and shows a folded-in state of the pivoting body.

Because of this, the seal 20 is supported by the attachment shaft 18D, and is able to tilt around the attachment shaft 18D in a restricting direction (i.e., a direction indicated by an arrow C in FIG. 7 (A)), and a release direction (i.e., a direction indicated by an arrow D in FIG. 7 (A)). In addition, the seal 20 is urged in the release direction.

A rectangular-column shaped restricting column 20B, which functions as a restricting portion, is formed on a vehicle front-side end portion of the seal 20. The restricting column 20B protrudes towards the outer side in the vehicle width direction, and extends in the vertical direction. A rectangular-column shaped tilting column 20C is formed on a vehicle rear-side end portion of the seal 20. The tilting column 20C protrudes towards the outer side in the vehicle width direction, and extends in the vertical direction. A corner surface on the vehicle rear side and outer side in the vehicle width direction of the tilting column 20C forms a curved surface 20D, and the curved surface 20D is curved in a convex shape.

In the facing frame 32 of the visor 30 of the pivoting body 28, the inner side surface in the vehicle width direction of the first facing plate 32B is disposed on the outer side in the vehicle width direction of the inner side surface in the vehicle width direction of the second facing plate 32C, so that a step 32E is formed between the inner side surface in the vehicle width direction of the first facing plate 32B and the inner side surface in the vehicle width direction of the second facing plate 32C. A distal end surface (i.e., an outer side surface in the vehicle width direction) of the tilting column 20C of the seal 20 abuts against the second facing plate 32C on the vehicle rear side of the step 32E, so that the seal 20 is tilted towards the restricting direction side in resistance to the urging force (see FIG. 7 (A)). The entire restricting column 20B of the seal 20 is placed in contact with the vehicle front-side surface of the recessed portion 18 of the base cover 16 in the vertical direction, and with the extension plate 32A of the facing frame 32, so that the restricting column 20B provides a seal between the facing frame 32 and the circumferential wall upper portion of the base cover 16, and communication between the vehicle front side and the vehicle rear side of the gap 34 between the facing frame 32 and the circumferential wall upper portion of the base cover 16 is restricted. Because of this, when the vehicle is traveling, the restricting column 20B restricts traveling wind from passing from the vehicle front side to the vehicle rear side through the gap 34, so that wind noise caused by the gap 34 can be inhibited.

Here, when the pivoting body 28 is being folded in or folded out, as a result of the distal end surface of the tilting column 20C of the seal 20 abutting against the first facing plate 32B on the vehicle front side of the step 32E of the facing frame 32, so that the seal 20 is tilted towards the release direction side by the urging force, the communication restriction created by the restricting column 20B of the seal 20 between the vehicle front side and the vehicle rear side of the gap 34 is released (see FIG. 7 (B)). Because of this, apart from the period during which the extension plate 32A of the facing frame 32 is being contacted by the restricting column 20B of the seal 20, and the period during which at least one of the first facing plate 32B or the second facing plate 32C of the facing frame 32 is being contacted by the tilting column 20C of the seal 20, and the period during which the extension plate 32A of the facing frame 32 is being contacted by the tilting column 20C of the seal 20, the facing frame 32 does not slide against the seal 20, and no sliding resistance is generated between the pivoting body 28 (i.e., the visor 30) and the seal 20. As a result, it is possible to inhibit the seal 20 from restricting the pivoting of the pivoting body 28 in the fold-in direction and the fold-out direction, and it is also possible to inhibit any reduction in the pivot performance of the pivoting body 28 that might be caused by the operation of the fold-in mechanism 26.

Furthermore, when the pivoting body 28 is being folded in or folded out, normally, the vehicle is stopped. Because of this, when the pivoting body 28 is being folded in or folded out, even if the communication restriction created by the restricting column 20B of the seal 20 between the vehicle front side and the vehicle rear side of the gap 34 is released, when the vehicle is traveling, wind noise caused by the gap 34 can be inhibited.

In addition, the seal 20 is tilted towards the release direction side by the urging force, and the communication restriction created by the restricting column 20B of the seal 20 between the vehicle front side and the vehicle rear side of the gap 34 is released. Because of this, when the pivoting body 28 is being folded in or folded out, it is possible to inhibit the extension plate 32A of the facing frame 32 from becoming caught on the restricting column 20B, and to thereby suitably inhibit the restricting column 20B from obstructing the pivoting of the pivoting body 28.

Furthermore, when the pivoting body 28 is being folded out, the curved surface 20D of the tilting column 20C of the seal 20 is abutted against the step portion 32E of the facing frame 32. As a result of this, the seal 20 is tilted towards the restricting direction side in resistance to the urging force, and the distal end surface of the tilting column 20C is abutted against the second facing plate 32C of the facing frame 32. Because of this, the tilting column 20C is inhibited from becoming caught on the step 32E by the curved surface 20D, and the seal 20 can be suitably tilted towards the restricting direction side.

In addition, the seal 20 is disposed on the inner side in the vehicle front-rear direction of the gap 34. Because of this, it is possible to inhibit the seal 20 from being visible from the outer side in the vehicle front-rear direction of the gap 34, so that the mirror device 50 for a vehicle can be furnished with a pleasing exterior appearance.

Note that in the above-described first exemplary embodiment and second exemplary embodiment, the seal 20 is provided in the base body 12. However, it is also possible for the seal 20 to be provided in the pivoting body 28.

Additionally, in the above-described first exemplary embodiment and second exemplary embodiment, the viewing instrument is a mirror. However, the viewing instrument may also be a camera that assists a vehicle occupant to perform viewing via acquired images.

What is claimed is:

1. A viewing device for a vehicle, the viewing device comprising:
   a supporting body provided at a vehicle body side;
   a pivoting body that is pivotably supported at the supporting body, with a gap being provided between the pivoting body and the supporting body in a radial direction of pivoting;
   a viewing instrument that is provided at the pivoting body, that facilitates viewing by a vehicle occupant, and that is folded in or folded out as a result of the pivoting body being pivoted to one side or to another side; and
   a restricting portion that is provided at one of the supporting body or the pivoting body, and that restricts communication between one side and another side of the gap, with the restriction of communication between the one side and the other side of the gap being released when the viewing instrument is folded in or folded out,
   wherein the gap between the pivoting body and the supporting body in the radial direction of the pivoting is a portion between the supporting body side formed of a curved surface and the pivoting body side formed of a flat surface.

2. The viewing device for a vehicle according to claim 1, further comprising a deforming portion that is provided at the restricting portion, that is curved, and that is elastically deformed by the other one of the supporting body or the pivoting body when the viewing instrument is being folded in or folded out, such that pivoting of the pivoting body is permitted.

3. The viewing device for a vehicle according to claim 1, wherein, when the viewing instrument is being folded in or folded out, the restricting portion becomes tilted such that pivoting of the pivoting body is permitted.

4. The viewing device for a vehicle according to claim 1, wherein the restricting portion is disposed at an inner side of the gap.

5. The viewing device for a vehicle according to claim 1, further comprising a contact surface that is provided at the other one of the supporting body or the pivoting body, that is flat, and that, when contacted by the restricting portion, restricts communication between the one side and the other side of the gap.

6. A viewing device for a vehicle, the viewing device comprising:
   a supporting body provided at a vehicle body side;
   a pivoting body that is pivotably supported at the supporting body, with a gap being provided between the pivoting body and the supporting body in a radial direction of pivoting;
   a viewing instrument that is provided at the pivoting body, that facilitates viewing by a vehicle occupant, and that is folded in or folded out as a result of the pivoting body being pivoted to one side or to another side; and
   a restricting portion that is provided at one of the supporting body or the pivoting body, and that restricts communication between one side and another side of the gap, with the restriction of communication between the one side and the other side of the gap being released when the viewing instrument is folded in or folded out,
   wherein the gap between the pivoting body and the supporting body in the radial direction of the pivoting is a portion between one of the supporting body side or the pivoting body side formed of a curved surface and another of the supporting body side or the pivoting body side formed of a flat surface, and
   the restricting portion is provided on the curved surface side.

7. A viewing device for a vehicle, the viewing device comprising:
   a supporting body provided at a vehicle body side;
   a pivoting body that is pivotably supported at the supporting body, with a gap being provided between the pivoting body and the supporting body in a radial direction of pivoting;
   a viewing instrument that is provided at the pivoting body, that facilitates viewing by a vehicle occupant, and that is folded in or folded out as a result of the pivoting body being pivoted to one side or to another side; and
   a restricting portion that is provided at one of the supporting body or the pivoting body, and that restricts communication between one side and another side of the gap, with the restriction of communication between the one side and the other side of the gap being released when the viewing instrument is folded in or folded out, and further comprising a deforming portion that is provided at the restricting portion, that is curved, and that is elastically deformed by the other one of the supporting body or the pivoting body when the viewing instrument is being folded in or folded out, such that pivoting of the pivoting body is permitted, wherein the deforming portion has a curved shape that protrudes in a convex shape, and a width dimension of the deforming portion is larger than a protrusion dimension thereof.

\* \* \* \* \*